United States Patent [19]

Hall

[11] Patent Number: 4,694,729
[45] Date of Patent: Sep. 22, 1987

[54] ELECTROMAGNETIC LAUNCHER ASSEMBLY

[75] Inventor: James R. Hall, Canoga Park, Calif.

[73] Assignee: Rockwell International Corporation, El Segundo, Calif.

[21] Appl. No.: 835,926

[22] Filed: Mar. 4, 1986

[51] Int. Cl.[4] .............................................. F41F 1/02
[52] U.S. Cl. ............................................. 89/8; 124/3; 310/12
[58] Field of Search ......................... 89/8; 310/10–14; 124/3; 60/259, 202

[56] References Cited

U.S. PATENT DOCUMENTS

| | | | |
|---|---|---|---|
| 1,370,200 | 3/1921 | Fauchon-Villeplee | 310/13 X |
| 3,508,086 | 4/1970 | Allport et al. | 310/11 |
| 4,258,546 | 3/1981 | Stratton | 60/259 |
| 4,319,168 | 3/1982 | Kemeny | 89/8 |
| 4,329,971 | 5/1982 | Kemeny et al. | 89/8 |
| 4,343,223 | 8/1982 | Hawke et al. | 89/8 |
| 4,467,696 | 8/1984 | McNab et al. | 89/8 |
| 4,527,457 | 7/1985 | Fikse | 310/13 X |
| 4,534,263 | 8/1985 | Heyne et al. | 89/8 |

OTHER PUBLICATIONS

R. S. Hawke, "Electromagnetic Railgun Launchers: Direct Launch Feasibility", AIAA Journal, vol. 20, No. 7, Jul. 1982, pp. 978–985.

Primary Examiner—Deborah L. Kyle
Assistant Examiner—John E. Griffiths
Attorney, Agent, or Firm—H. Fredrick Hamann; Harry B. Field; David C. Faulkner

[57] ABSTRACT

An electromagnetic launcher assembly 10 includes a magnetohydrodynamic power generator 12 for generating electrical energy. The energy is stored in an inductor 26 which is provided with current directing means 30 for selectively routing an electrical charge to activate a rail gun assembly 28 which initiates the firing of a projectile 32 out of the rail gun assembly.

4 Claims, 2 Drawing Figures

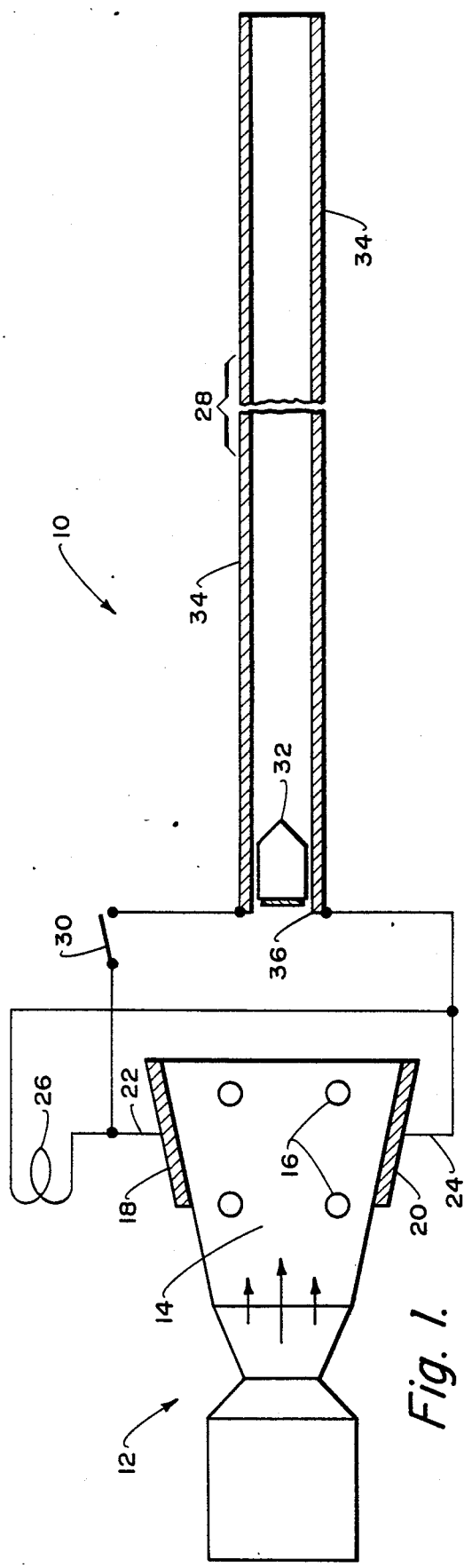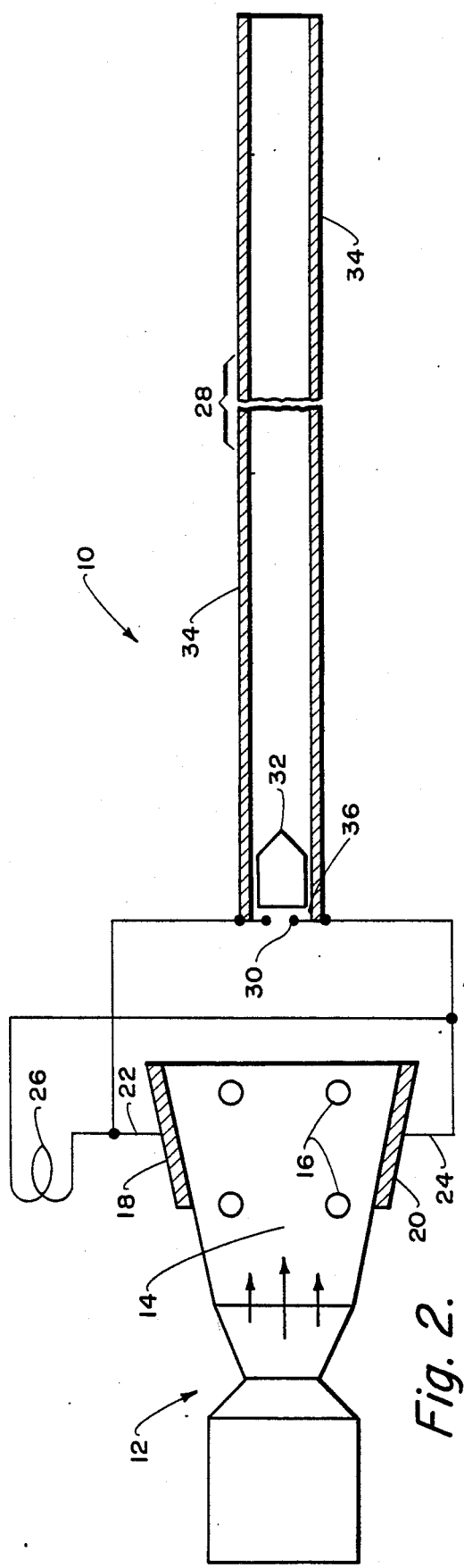

4,694,729

ELECTROMAGNETIC LAUNCHER ASSEMBLY

BACKGROUND OF THE INVENTION

1. Field of the Invention

The invention relates to an electromagnetic launcher assembly, and is particularly directed to a launcher system utilizing a pulsed power generator combined with a nonmechanical current diversion switch for controllably firing a projectile.

2. Description of the Prior Art

Research in electromagnetic systems and devices has identified the need for a launcher system incorporating a reliable and controllable power source. Such a system must be capable of supplying in excess of 1,000 megawatts of controlled electrical power for relatively short durations; typically a few milliseconds for electromagnetic launchers. Conventional systems have utilized, in combination, a high power generator with either an induction coil or a bank of capacitors interconnected with the launcher assembly. The conventional power sources are limited by size and output constraints. The mechanical switching devices incorporated in the conventional systems to control current flow are unreliable.

Other disadvantages associated with conventional electromagnetic systems include the long transition before full power is available when the power is to be supplied to a weapon system on short notice. Another disadvantage of these systems is the interval required to recharge the capacitor banks; a limiting factor in the rate of fire in an electromagnetic launcher system.

BRIEF SUMMARY AND OBJECTIVES OF THE INVENTION

Accordingly, the present invention overcomes the disadvantages of the prior art by providing a self-excited electromagnetic launcher assembly which combines the three functions of power source, inductive energy storage, and electric current conductor and current directing means to controllably channel the current to effect the launch of a projectile.

The electromagnetic launcher assembly includes a magnetohydrodynamic power generator, an energy storage inductor, and current directing or control means and a projectile housing. The combination of a self-excited pulsed magnetohydrodynamic power generator as a power source in functional cooperation with an inductor in a rail launcher assembly minimizes regenerative "down time" in the system circuitry and avoids the weight and cooling problems inherent in known rail launcher assemblies. One power generator suitable for use in the present invention is detailed in U.S. Pat. No. 4,258,546 assigned to the assignee of the present invention and incorporated herein by reference.

An object of the present invention is to provide an improved electromagnetic launcher assembly.

Another object of the present invention is to provide an assembly which utilizes a pulsed electric power generating system in cooperative association with a rail launcher.

A further object of the invention is to provide such an assembly which incorporates a nonmechanical current control device associated with the electric power generating system for directing energy stored in an inductor to a rail launcher.

These and other objects and features of the present invention will be apparent from the following detailed description, taken with reference to the accompanying drawings.

BRIEF DESCRIPTION OF THE DRAWINGS

FIG. 1 illustrates one embodiment of an electromagnetic launcher assembly in accordance with the present invention.

FIG. 2 is a diagrammatic representation of the electromagnetic launcher assembly showing another embodiment of the invention.

DETAILED DESCRIPTION OF THE INVENTION

Referring to the drawings wherein the same elements or parts throughout the figures of the drawings are designated by the same reference characters, FIGS. 1 and 2 show an electromagnetic launcher assembly 10 including a self-excited pulsed electric power generator 12 which supplies hot ionized, high velocity, conductive gases (as indicated by the arrows). The conductive ionized gases are produced during fuel combustion by the addition of an alkali metal salt or metal such as aluminum, magnesium, beryllium or the like to the generator fuel supply. These gases pass through a plasma channel 14 and a magnetic field (indicated by symbols 16). The magnetic field 16 may be produced by permanent magnets or by electromagnetic field generating coils (not shown) placed in close proximity and coupled to the plasma channel 14. At right angles to the direction of flow of hot gas and at right angles to the magnetic field there are provided electrodes 18 and 20. Electrical conductors 22 and 24 interconnect electrodes 18 and 20 to the energy storage inductor 26 so that the electromotive force produced in the gas at right angles to the magnetic field and the direction of the hot gas will cause a direct electric current to flow between the electrodes 18 and 20 and through the inductor 26.

The electrical conductors 22 and 24 are also connected to a rail launcher assembly 28 including projectile retaining and guiding means. The assembly is provided with current directing means 30 associated therewith for selectively routing the current produced by energy stored in the inductor 26 upon demand. The current directing means may be a closing switch, a diode or a spark gap.

In operation, the pulsed-firing rocket engine or electric power generator 12 is initiated and produces a conductive hot gas. The hot ionized combustion gases are accelerated through a nozzle to a velocity of at least 2000 meters/second (Mach 2.5).

The hot high velocity gases then enter the duct or channel 14 where they pass through the magnetic field 16. As the conductive gases flow through the duct 14 and magnetic field 16, a voltage generated across electrodes 18 and 20 will cause current to flow through the energy storage inductor 26 which will store the energy in its magnetic field. If the field of the energy storage inductor 26 is additively coupled to the duct field 16, the magnitude field in duct 14 will increase. This operation would continue in a regenerative manner to a steady state value where the generated power balances the power losses in the circuit elements. Initially, the current is directed through the circuitry in a closed loop. The current directing means 30, as shown in FIG. 1, is a closing switch in an open position which precludes the current from flowing to the rail launcher assembly 28.

When it is desired to activate the rail launcher and fire a projectile 32, the plasma flow in the channel of the magnetohydrodynamic generator 12 is cut off causing the generator to function as an opening switch which interrupts the current flow through the assembly circuitry. The rapid increase in electrical resistance of the plasma in the channel causes the current to reduce and the magnetic field of the energy storage inductor to collapse. The collapsing magnetic field will convert the stored energy of the inductor magnetic field into a large induced voltage (flyback voltage) across the inductor terminals which will cause the current to continue to flow in the same direction and tend to maintain the same current magnitude. When the current directing means 30, is in a closed position the current is directed to the rail gun assembly 28. The current now flowing in the rail gun assembly through the projectile armature or projectile 32 generates the well known Lorentz force which accelerates the projectile down rails 34 of the rail launcher assembly 28. This process will continue until the energy in the storage inductor 26 has been depleted by transfer to the rail assembly 28 and projectile 32. With regard to the conducting armature or projectile 32 shown in FIG. 1, the projectile is designed whereby only the breech end is conductive. Alternatively, the entire projectile may be conductive.

The current directing means 30 may also be a diode (not shown) connected in such a polarity that the voltage produced by the magnetohydrodynamic generation process will not flow into the electromagnetic launcher. The interruption of the plasma flow and the resultant interruption of the current flow to the storage inductor 26 will result in the same induced (flyback) voltage across the inductor which is in the opposite polarity to the original applied voltage and will then cause the current to be directed through the diode to the electromagnetic launcher circuit.

The current directing means 30 may be a spark gap whose dimensions are such that the magnetohydrodynamic generated voltage is less than the breakdown voltage of the spark gap thereby isolating the electromagnetic launcher from the circuit during charging of the energy storage inductor. The interruption of the plasma flow and the resultant current flow through the generator causes the energy storage inductor field to collapse producing the induced (flyback) voltage which will be of sufficient magnitude to cause breakdown of the spark gap thereby dirrecting the current to the electromagnetic rail launcher assembly 28. The embodiment shown in FIG. 2 places the current directing means 30 which is a spark gap across the rail launcher breech which contains a nonconducting projectile. The plasma flow interruption causes the induced flyback voltage to breakdown the spark gap across the rails 34 of the launcher creating plasma which drives the projectile 32 down the rails 34 and away from the launcher assembly breech 36. While one embodiment has been shown in which the energy storage inductor produces a magnetic field which regeneratively adds to the field used to produce power by magnetohydrodynamic means, it is understood that the principal of current interruption by the plasma flow control and the current direction or flow control by all the embodiments of switching means 30 will apply equally well to the use of an independent energy storage inductor which is not magnetically coupled to the generator, or a combination thereof.

Various modifications can be made in the design and operation of the present invention without departing from the spirit thereof. Thus, while the principal, preferred construction, and mode of operation of the invention have been explained and what is now considered to represent its best embodiments have been illustrated and described, it should be understood that within the scope of the appended claims the invention may be practiced otherwise then as specifically illustrated and described.

What is claimed and desired to be secured by Letters Patent of the United States is:

1. A method for producing and directing current for activation of an electromagnetic launcher assembly comprising:
   producing pulsed, ionized, conductive hot gases having a velocity of about 2000 meters/second with a magnetohydrodynamic power generator;
   channeling and directing the conductive hot gases produced by the generator into a generator channel having a magnetic field associated therewith to produce electric power;
   conducting the electric power from the generator channel to an energy storage means to store electric power energy;
   selectively routing the electric power from the energy storage means through assembly circuitry;
   causing the generator to function as a non-mechanical opening switch by interrupting current flow through assembly circuitry;
   increasing electrical resistance in the channel;
   causing the collapse of the magnetic field associated with the generator field to generate a flyback voltage; and
   directing the flyback voltage to the launcher assembly to activate same.

2. The method of claim 1 in which the electric power is conducted to the energy storage means by electrical conductors associated with the generator channel.

3. The method of claim 1 in which the energy storage means stores the electric energy in a magnetic field.

4. The method of claim 1 in which the generator is caused to function as a non-mechanical opening switch by the cessation of the flow of hot gases from the magnetohydrodynamic generator into the generator channel.

* * * * *